(12) United States Patent
Malfand

(10) Patent No.: US 8,414,843 B2
(45) Date of Patent: Apr. 9, 2013

(54) FORCED-CIRCULATION CRYSTALLIZER

(75) Inventor: Michel Malfand, Draveil (FR)

(73) Assignee: Crystal-Evap Consult (FR)

( * ) Notice: Subject to any disclaimer, the term of this patent is extended or adjusted under 35 U.S.C. 154(b) by 0 days.

(21) Appl. No.: 12/666,854

(22) PCT Filed: Jun. 23, 2008

(86) PCT No.: PCT/FR2008/051122
§ 371 (c)(1),
(2), (4) Date: Dec. 28, 2009

(87) PCT Pub. No.: WO2009/007577
PCT Pub. Date: Jan. 15, 2009

(65) Prior Publication Data
US 2010/0183489 A1    Jul. 22, 2010

(30) Foreign Application Priority Data
Jul. 9, 2007  (FR) ...................................... 07 56346

(51) Int. Cl.
*B01D 9/00*   (2006.01)
(52) U.S. Cl.
USPC ........ 422/245.1; 422/249; 117/200; 23/295 R

(58) Field of Classification Search ............... 422/245.1, 422/249; 117/200; 23/295 R
See application file for complete search history.

(56) References Cited

U.S. PATENT DOCUMENTS

| 4,294,807 | A | | 10/1981 | Randolph |
| 5,906,660 | A | * | 5/1999 | Pardini et al. ................ 23/295 R |
| 2003/0180202 | A1 | * | 9/2003 | Ellen et al. .................. 422/245.1 |

FOREIGN PATENT DOCUMENTS

WO     93/19826     10/1993

* cited by examiner

*Primary Examiner* — Bob M Kunemund
(74) *Attorney, Agent, or Firm* — Gerald E. Hespos; Michael J. Porco; Matthew T. Hespos

(57) ABSTRACT

A crystallizer for crystallizing solute contained in a solution has first (2) and second (1) communicating chambers, for the solution, and a heat exchanger (20) for keeping a state of supersaturation therein. A first circuit extracts from a calm zone (15) of the latter chamber a first stream of liquid containing small crystals and recycles this stream into the first chamber. A second circuit extracts from the second chamber a second stream of liquid containing coarse crystals and brings this second stream into the first chamber. The downstream end (26) of the first circuit runs into the second circuit so that the first and second liquid streams are made to flow in the same direction into said second circuit.

12 Claims, 1 Drawing Sheet

FORCED-CIRCULATION CRYSTALLIZER

BACKGROUND OF THE INVENTION

1. Field of the Invention

The present invention relates to a crystallizer for crystallizing solute contained in a solution to be treated.

2. Description of the Related Art

It is generally accepted that known crystallizers are of three types.

Firstly, there are what are called forced-circulation crystallizers, which comprise a chamber intended to contain the solution to be treated and a circuit external to this chamber for conveying said solution to be circulated, through the action of a circulating pump, from an outlet located at the bottom of said chamber to an inlet located at the top of the latter, passing through a heat exchanger in order to create a state of supersaturation within the solution. This type of crystallizer gives crystals of moderate size (usually 250-400 μm) with quite a wide crystal size distribution.

Secondly, there are what are called Oslo crystallizers, which comprise a chamber intended to hold the solution to be treated and in which this solution is made to circulate from the top downward through a central downflow tube, before rising back up in the chamber around this tube, and being extracted therefrom, in a relatively clear form, i.e. with a low content of crystals, by a circuit external to the chamber, which brings this solution back to the top of the chamber after passing through a heat exchanger in order to create a state of supersaturation. The crystals obtained with this type of crystallizer are relatively coarse (usually 1.5-2 mm) with a moderate crystal size distribution.

Thirdly, there are what are called DTB (draft tube baffle) crystallizers, in which the solution to be treated is made to circulate, under the effect of a stirrer creating an ascending movement, from the bottom up through a central tube and then from the top down around this tube, before reaching a calm zone where the solution has a low content of crystals and from where said solution is extracted, before being reheated in order to dissolve the finest crystals (or fines) and then reintroduced into the base of the crystallizer. The crystals obtained are relatively coarse (usually 1-2 mm) because the fines have been removed, but with a relatively broad size distribution because of the mechanical destruction of the crystals by the stirrer. Furthermore, the use of this stirrer has various drawbacks such as: difficulty of installation; sealing problems; necessary monitoring, in order to detect any blockage.

As will have been understood, the existing crystallizers described above have design and implementation difficulties and/or inadequacies in terms of crystal size and crystal size distribution.

SUMMARY OF THE INVENTION

The object of the present invention is to provide a crystallizer of simple design, enabling crystals to be obtained with a size that can be adjusted at will, with a narrow crystal size distribution.

For this purpose, the crystallizer according to the invention comprises:

first and second chambers intended to hold said solution to be treated;

means for keeping at least one portion of this solution in a state of supersaturation in order to form crystalline particles of the solute therein;

means for circulating said solution from the first chamber to the second chamber in order to keep said crystalline particles in suspension;

means for isolating, within the second chamber, in at least one calm zone communicating with said second chamber, a portion of the solution intended to be present in this second chamber;

a first circuit for selectively extracting, from said calm zone, a first stream of liquid comprising smaller crystalline solute particles and for recycling this first stream into the first chamber; and a second circuit for selectively extracting, from the second chamber, a second stream of liquid comprising larger crystalline solute particles and for bringing this second stream into the first chamber, the downstream end of the first circuit running into the second circuit so that the first and second liquid streams are made to flow in the same direction in said second circuit.

It will be readily understood that the second circuit, i.e. the one followed by the liquid stream containing the coarsest crystalline particles (crystals), does not require the use of a circulating pump since this stream will be conveyed to the first chamber under the effect of the first stream circulating in the first circuit.

Because of the absence of this pump, the coarse crystals will not be subjected to any mechanical stress liable to reduce them to finer crystals, so that it is possible to obtain relatively coarse crystals with a narrow crystal size distribution.

According to one embodiment, the downstream end portion of the first circuit is placed approximately concentrically in the second circuit. This arrangement results in an intake, and therefore an entrainment of the stream comprising the coarse crystals, with a minimum of turbulence, thereby eliminating any risk of these coarse crystals being destroyed.

The means for keeping the solution in a state of supersaturation preferably comprise a heater, for heating the first stream of liquid, placed in said first circuit and a vapor outlet provided on the second chamber. In this case, the heater may comprise an indirect heat exchanger comprising a circuit for a heat-transfer fluid and a circuit for a fluid to be heated, the latter circuit constituting a portion of said first circuit.

It should be noted that, when the crystallizer according to the invention is intended for crystallizing a solute contained in a solution comprising a mixture which is the site of an exothermic reaction, the means for keeping the solution in a state of supersaturation comprise the heat released by this reaction. As an example of such a solution, a mixture of sulfuric acid and ammonia for obtaining ammonium sulfate may be mentioned.

Advantageously, the means for circulating the solution from the first chamber to the second chamber comprise a circulating pump placed in the first circuit.

As is known, crystals of the solute are formed as a consequence of the desupersaturation resulting either from the deposition of solute on existing crystals, which leads to coarse crystals, or from the formation of new solute crystals (seeds) of small size (fines).

It will be readily understood that if coarse solute crystals are desired, it is necessary as far as possible to avoid the formation of fines or to eliminate them.

Therefore, according to one particular embodiment, the crystallizer according to the invention may comprise a third circuit for removing crystalline particles of a given crystal size, preferably the smallest ones among the crystalline particles present in the first stream of liquid or in the calm zone or one of the calm zones of the second chamber.

This third circuit may comprise a solid-liquid separator placed in the first circuit, in order to form a third stream of liquid containing said crystalline particles of a given crystal size, and means for heating this third stream so as to dissolve said crystalline particles, this third circuit terminating in the first circuit.

According to one variant, said third circuit starts in the calm zone or in one of the calm zones of the second chamber for extracting therefrom said crystalline particles of a given crystal size in the form of a liquid stream, includes means for heating this stream, in order to dissolve said crystalline particles, and terminates in the first circuit.

According to one embodiment, the crystallizer according to the invention is characterized in that the second chamber comprises an approximately vertical cylindrical side wall and is closed off by an upper end wall and a lower end wall, in that the first chamber comprises a tubular part extending, approximately concentrically, inside the second chamber, passing through the lower end wall of the latter, and in that said means for isolating at least one portion of the solution in the second chamber comprise a partition which starts on the cylindrical side wall of the second chamber along at least one portion of the latter, extends approximately radially toward the interior of this chamber and then extends toward the first chamber approximately parallel to the tubular part of the latter, so as thus to define, with said cylindrical side wall, said calm zone.

Within the context of the above embodiment, the second circuit comprises a duct starting in the second chamber near the zone where the lower end wall of this second chamber is penetrated by the tubular part of the first chamber, said second circuit terminating in the latter. In this same crystallizer, the first chamber includes, in its bottom part, a zone intended to hold said larger crystalline particles, this zone being provided with an outlet for these particles.

The invention will now de described in greater detail with reference to one particular embodiment, given solely by way of illustration and represented in the appended drawing.

DETAILED DESCRIPTION OF THE PREFERRED EMBODIMENT

Figure 1:
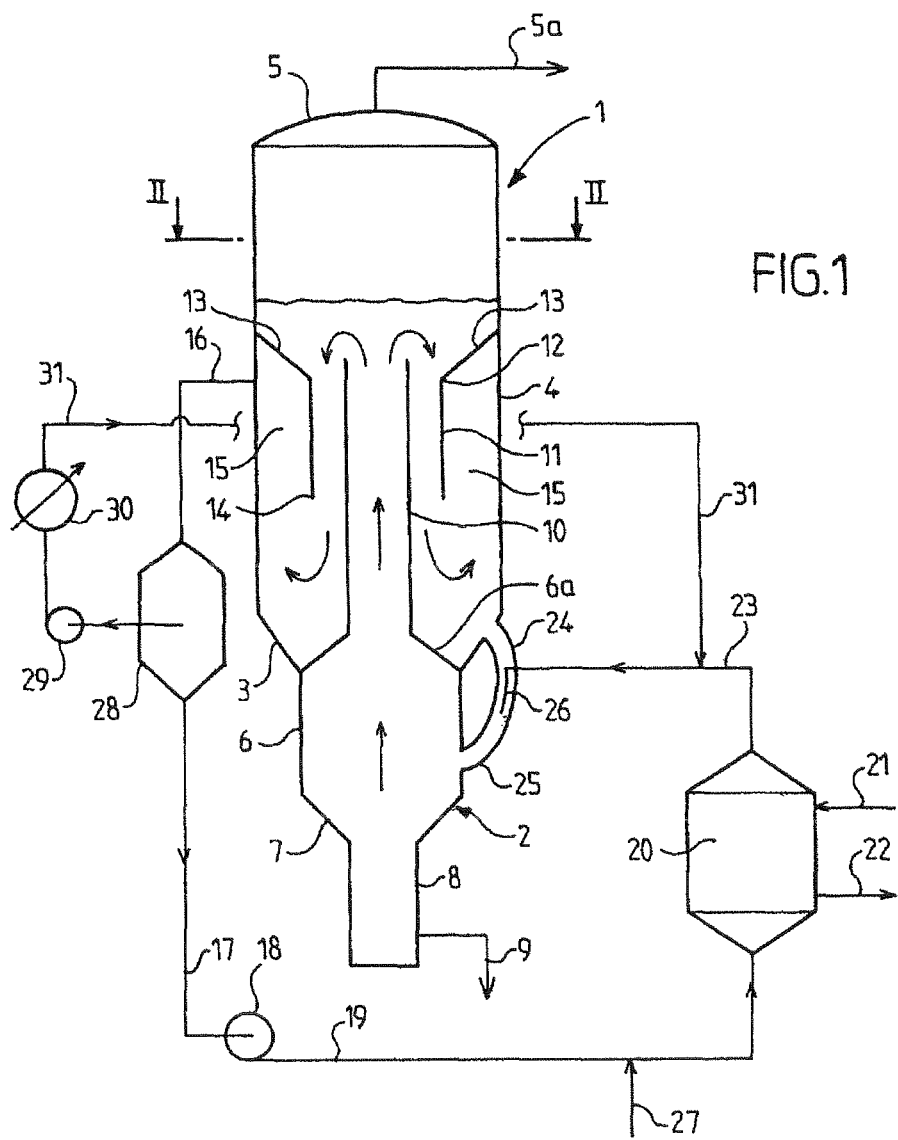
FIG. 1 is a schematic vertical section through the crystallizer.
Figure 2:
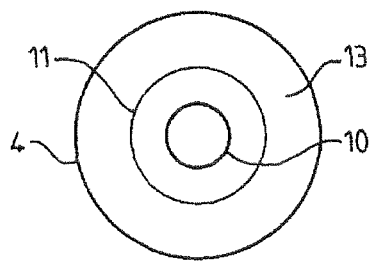
FIG. 2 is a cross section along the line II-II of FIG. 1.

The above-mentioned figures show a crystallizer that comprises an upper chamber 1 resting on a lower chamber 2.

The upper chamber 1 comprises a frustoconical lower portion 3, the upper large base of which is joined to a vertical cylindrical wall 4 closed at its upper end by an upper end surface 5 provided with a vapor outlet 5a.

The lower chamber 2 itself comprises an approximately vertical cylindrical side wall 6 terminating at its base in a frustoconical part 7, the lower small base of which is extended downward by a cylindrical part 8 closed off at its lower part and provided, near this closure, with an outlet 9 for liquid with a high content of coarse crystals.

The surface 6 is joined in its upper part to the small base of the frustoconical part 3, before being extended by a frustoconical surface 6a, the small base of which terminates in a vertical tube 10 placed approximately concentrically inside the chamber 1.

The height of this tube 10 is chosen so that its upper end is located a short distance below the level of the solution intended to be treated in the crystallizer.

Moreover, a cylindrical partition 11 is placed concentrically in the chamber 1, around the tube 10. This partition 11 is joined by its upper peripheral edge 12 to the side wall 4 via an upwardly inclined surface 13.

It should be noted that the lower peripheral edge 14 of the partition 11 is at a sufficient distance from the lower end of the chamber 1 so that the zone 15 defined between said partition 11, the side wall 4 and the inclined surface 13 is a calm zone, one that is not disturbed by the turbulence existing outside this same zone 15.

The side wall 4 is provided, in the zone 15, with a liquid outlet 16 connected to the intake side 17 of a pump 18, the delivery side 19 of which communicates with the inlet of the circuit of fluid to be heated, of an indirect heat exchanger 20, the heat-transfer fluid (for example steam) circuit of which includes an inlet 21 and an outlet 22.

The outlet of the circuit of heated fluid of the heat exchanger 20 is joined to a line 23 intended to return the heated fluid from the heat exchanger 20 to the chamber 2.

According to one essential feature of the invention, the frustoconical part 3 is provided with an outlet 24 which communicates with the interior of the chamber 2 via a duct 25.

The line 23 runs into the duct 25 so that its downstream end 26 is placed concentrically in this duct 25 and the fluid in the latter flows out into the chamber 2.

The crystallizer thus described is completed by an intake 27 of solution to be treated, this being located upstream of the heat exchanger 20.

The operation of this crystallizer is as follows.

The solution to be treated, the solute of which it is desired to crystallize, is injected into the crystallizer via the intake 27, so as to reach the desired level in the chamber 1, the pump 18 being in operation. The solute concentration of this solution will of course depend on the nature of the solute and is chosen so that said solution is close to saturation.

Of course, the level in the chamber 1 is kept approximately constant throughout the duration of the crystallization operations, for example by adjusting the flow rate of fresh solution conveyed by the intake 27 or by extracting the mother liquor at any point in the installation.

The heat exchanger 20 is brought into operation as soon as said level is reached. This heat exchanger is regulated so as to evaporate liquid sufficiently in order for at least one portion of the solution to reach supersaturation. When appropriate, this evaporation may be facilitated by connecting the vapor outlet 5a to a vacuum source.

Under these conditions, seeds form or, if small crystals are already present in this solution, the latter grow.

The flow rate in the chambers 1 and 2 is regulated by means of the pump 18, which is preferably a variable flow pump, in order for the crystals and seeds formed to be kept in suspension and for only the seeds and the crystals having a size equal to or smaller than a threshold value to be conveyed to the outlet 16, from which they are removed from the zone 15.

In fact, in this zone, the crystallized particles are distributed with a gradient of particle sizes, the finest particles being located in the uppermost part.

The clear liquid, i.e. with a relatively low content of fine particles, coming from the outlet 16 is then brought, through the action of the pump 18 to the heat exchanger 20 where it is heated to an appropriate temperature before being injected into the chamber 2 via the members 23, 25 and 26.

During their movement through the chamber 2, the tube 10, the chamber 1 and the zone 15, before returning to the chamber 2, the crystalline seeds and particles coarsen and perform this cycle until they reach a sufficient size above which the coarse crystalline particles thus formed collect at the base of the chamber 1, from which they are removed via the outlet 24 to the chamber 2 under the intake/entrainment effect of the liquid flowing out of the downstream end 26 of the line 23.

It should be noted that the relative dimensions of the ducts 23, 24, 26 are such that the crystals can be removed without hindrance from the chamber 1.

Given that these coarse crystalline particles are subjected to no mechanical stress, they suffer no rupture or disintegration and they are collected whole in the cylindrical part 8 from where they are extracted via the outlet 9.

According to another feature of the invention, if even larger-sized crystalline particles are desired, a solid-liquid separator 28 is provided between the outlet 16 and the intake side 17 of the pump 18.

The liquid fraction having the lowest concentration of crystalline particles continues its path toward the pump 18.

The fraction of the liquid having the highest concentration of crystalline particles (usually representing about $\frac{1}{10}$ to $\frac{1}{15}$ of the liquid entering the separator) is taken via a circulating pump 29 into a heat exchanger 30 where it is heated to a temperature sufficient to dissolve said crystalline particles, before said fraction is returned via the line 31 into the line 23.

Under these conditions, upon desupersaturation, the solute is deposited not on the finest crystals (i.e. the fines) but on coarser crystalline particles, leading in the end to coarse crystals being obtained.

According to a variant, a separator 28 is omitted and the intake side of the pump 29 is connected directly to the calm zone 15, preferably at a certain distance from the outlet 16.

According to another variant, it would be possible to provide at least one other circuit external to the chambers 1 and 2 of the same structure as the circuit 16-17-18-19-20-23-26 but starting at another point in the calm zone 15 and terminating in a circuit identical to the circuit 24-25, which itself starts at the base of the chamber 1 at a certain distance from the outlet 24.

The advantages of the present invention are numerous:

the possibility of obtaining a narrow crystal size distribution;

the possibility of modifying at will the size of the crystals by varying the amount of fines eliminated, the absence of such elimination resulting in crystals that are smaller than those obtained by eliminating the fines;

in the event of solute blocks forming on the internal surface of the cylindrical side wall 4 of the upper chamber 2, these blocks, when they become detached, cannot fall into the lower cylindrical part 8 of the lower chamber 1 and thus block the extraction of the crystals;

the technology according to the invention can be used for small and large capacity crystallizers;

ease of extrapolating from pilot trials, since the circulation of the liquid and of the crystalline particles is "quasi-linear" in the absence of a stirrer (as in the DTB case);

the possibility of using the crystallizer as a forced-circulation crystallizer (with no destruction of the fines) or as a DTB crystallizer (with destruction of the fines) and with large crystals being obtained; and the crystallizer may be used as a crystallizer-reactor (in which case the solution is a reaction mixture, the product of which has to be crystallized), as a crystallizer-separator (in which case a purification is required) or as a simple crystallizer (in which case a solute is sought in the form of crystals).

The invention claimed is:

1. Crystallizer for crystallizing solute contained in a solution to be treated, characterized in that it comprises:

first (2) and second (1) chambers intended to hold said solution to be treated;

means (20) for keeping at least one portion of this solution in a state of supersaturation in order to form crystalline particles of the solute therein;

means for circulating said solution from the first chamber to the second chamber in order to keep said crystalline particles in suspension;

means (11, 13) for isolating, within the second chamber, in at least one calm zone (15) communicating with said second chamber, a portion of the solution intended to be present in this second chamber;

a first circuit (16, 17, 18, 19, 20, 23, 26, 25) for selectively extracting, from said calm zone, a first stream of liquid comprising smaller crystalline solute particles and for recycling this first stream into the first chamber; and a second circuit (24, 25) for selectively extracting, from the second chamber, a second stream of liquid comprising larger crystalline solute particles and for bringing this second stream into the first chamber, the downstream end (26) of the first circuit running into the second circuit so that the first and second liquid streams are made to flow in the same direction in said second circuit.

2. Crystallizer according to claim 1, characterized in that the downstream end portion (26) of the first circuit is placed approximately concentrically in the second circuit.

3. Crystallizer according to claim 1, characterized in that the means for keeping the solution in a state of supersaturation comprise a heater, for heating the first stream of liquid, placed in said first circuit and a vapor outlet (5a) provided in the second chamber.

4. Crystallizer according to claim 3, characterized in that the heater comprises an indirect heat exchanger (20) comprising a circuit for a heat-transfer fluid (21, 22) and a circuit for a fluid to be heated, the latter circuit constituting a portion of said first circuit.

5. Crystallizer according to claim 3, for crystallizing a solute contained in a solution comprising a mixture wherein an exothermic reaction, takes place, characterized in that the means for keeping the solution in a state of supersaturation comprise the heat released by this reaction.

6. Crystallizer according to claim 1, characterized in that the means for circulating the solution from the first chamber to the second chamber comprise a circulating pump (18) placed in the first circuit.

7. Crystallizer according to claim 1, characterized in that it comprises a third circuit for removing crystalline particles of a given crystal size, preferably the smallest ones, among the crystalline particles present in the first stream of liquid or in the calm zone or one of the calm zones of the second chamber.

8. Crystallizer according to claim 7, characterized in that said third circuit comprises a solid-liquid separator (28) placed in the first circuit, in order to form a third stream of liquid containing said crystalline particles of a given crystal size, and means (30) for heating this third stream so as to dissolve said crystalline particles, this third circuit terminating in the first circuit.

9. Crystallizer according to claim 7, characterized in that said third circuit starts in the calm zone or in one of the calm zones of the second chamber for extracting therefrom said crystalline particles of a given crystal size in the form of a liquid stream, includes means for heating this stream, in order to dissolve said crystalline particles, and terminates in the first circuit.

10. Crystallizer according to claim 1, characterized in that the second chamber (1) comprises an approximately vertical cylindrical side wall (4) and is closed off by an upper end wall (5) and a lower end wall (6a), in that the first chamber (2) comprises a tubular part (10) extending, approximately concentrically, inside the second chamber, passing through the lower end wall (6a) of the latter, and in that said means for isolating at least one portion of the solution in the second chamber comprise a partition (11, 13) which starts on the cylindrical side wall (4) of the second chamber along at least one portion of the latter, extends substantially radially toward the interior of this chamber and then extends toward the first chamber approximately parallel to the tubular part (10) of the latter, so as thus to define, with said cylindrical side wall, said calm zone.

11. Crystallizer according to claim 10, characterized in that the second circuit comprises a duct (24, 25) starting in the second chamber (1) near the zone where the lower end wall (6a) of this second chamber is penetrated by the tubular part (10) of the first chamber (2), said second circuit terminating in the latter.

12. Crystallizer according to claim 11, characterized in that the first chamber includes, in its bottom part, a zone (8) intended to hold said larger crystalline particles, this zone being provided with an outlet (9) for these particles.

* * * * *

UNITED STATES PATENT AND TRADEMARK OFFICE
CERTIFICATE OF CORRECTION

PATENT NO.        : 8,414,843 B2
APPLICATION NO.   : 12/666854
DATED             : April 9, 2013
INVENTOR(S)       : Michel Malfand Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this
Twenty-fifth Day of June, 2013

Teresa Stanek Rea
*Acting Director of the United States Patent and Trademark Office*